United States Patent
Matsuo et al.

(10) Patent No.: US 9,868,110 B2
(45) Date of Patent: Jan. 16, 2018

(54) METHOD FOR PRODUCING COMPOSITE OXIDE AND COMPOSITE OXIDE CATALYST

(71) Applicant: SANTOKU CORPORATION, Kobe-shi, Hyogo (JP)

(72) Inventors: Shinya Matsuo, Kobe (JP); Tadatoshi Murota, Kobe (JP)

(73) Assignee: SANTOKU CORPORATION, Kobe-shi, Hyogo (JP)

(*) Notice: Subject to any disclaimer, the term of this patent is extended or adjusted under 35 U.S.C. 154(b) by 350 days.

(21) Appl. No.: 14/434,115

(22) PCT Filed: Oct. 1, 2013

(86) PCT No.: PCT/JP2013/076662
§ 371 (c)(1),
(2) Date: Apr. 8, 2015

(87) PCT Pub. No.: WO2014/057839
PCT Pub. Date: Apr. 17, 2014

(65) Prior Publication Data
US 2015/0258532 A1    Sep. 17, 2015

(30) Foreign Application Priority Data
Oct. 8, 2012    (JP) .................................. 2012-223741

(51) Int. Cl.
*B01J 23/10* (2006.01)
*B01J 37/10* (2006.01)
(Continued)

(52) U.S. Cl.
CPC ............ *B01J 23/10* (2013.01); *B01D 53/945* (2013.01); *B01J 23/002* (2013.01); *B01J 23/42* (2013.01); *B01J 23/464* (2013.01); *B01J 23/72* (2013.01); *B01J 23/745* (2013.01); *B01J 23/755* (2013.01); *B01J 23/892* (2013.01); *B01J 23/894* (2013.01); *B01J 37/0207* (2013.01); *B01J 37/031* (2013.01); *B01J 37/04* (2013.01); *B01J 37/08* (2013.01); *B01J 37/10* (2013.01); *C01B 3/40* (2013.01); *C01G 25/00* (2013.01); *B01D 2255/1021* (2013.01); *B01D 2255/1023* (2013.01); *B01D 2255/1025* (2013.01); *B01D 2255/2065* (2013.01); *B01D 2255/2066* (2013.01); *B01D 2255/20715* (2013.01);
(Continued)

(58) Field of Classification Search
CPC . B01J 23/00; B01J 23/10; B01J 23/894; B01J 23/002; B01J 23/42; B01J 23/464; B01J 23/72; B01J 23/745; B01J 23/755; B01J 23/892; B01J 2523/00; B01J 2523/3712; B01J 2523/3718; B01J 2523/48; B01J 2523/824; B01J 2523/847; B01J 37/04; B01J 37/08; B01J 37/10; B01J 37/2707; B01J 37/031; B01J 37/0201; B01D 53/945; B01D 53/94; B01D 2255/20753; B01D 2255/20715; B01D 2255/2065; B01D 2255/2066; B01D 2255/1023; B01D 2255/1021; B01D 2255/1025; B01D 2255/20738; B01D 2255/20761; B01D 2255/407; C01B 2203/1082; C01B 2203/1058; C01B 2203/0233; C01B 2203/1064; C01B 2203/1047; C01B 2203/1076; C01B 2203/1021; C01B 3/40
See application file for complete search history.

(56) References Cited

U.S. PATENT DOCUMENTS

2001/0026782 A1    10/2001    Wang et al.
2006/0178261 A1    8/2006    Larcher et al.
(Continued)

FOREIGN PATENT DOCUMENTS

CN    101444740 A    6/2009
EP    2 344 427    7/2011
(Continued)

OTHER PUBLICATIONS

JP2007504091—machine translation same as JP4755988, Wan-Jae et al.*
JP2009263150—machine translation, Yamamoto et al.*
Qi, Yan et al., "Preparation of Ceria-Zirconia Solid Solution by Urea-Based Hydrothermal-Coprecipitation Method and its Catalytic Application", Journal of the Chinese Rare Earth Society, vol. 23, pp. 51-54 (2005).
(Continued)

Primary Examiner — Melvin C Mayes
Assistant Examiner — Smita Patel
(74) Attorney, Agent, or Firm — Sughrue Mion, PLLC

(57) ABSTRACT

Provided are a method for producing a composite oxide and the composite oxide, which finds use as an easy-to-handle catalyst material having a high reforming rate of hydrocarbon to hydrogen even when oxidized. The method includes the steps of: (a) preparing a Ce aqueous solution not less than 80 mol % of which Ce ions are tetravalent, and a Zr aqueous solution containing Zr ions; (b1) mixing the Zr aqueous solution and a portion of the Ce aqueous solution to prepare a mixed aqueous solution (X1); (c1) hydrothermally processing solution (X1); (b2) adding the remainder of the Ce aqueous solution prepared in step (a) to a colloidal solution (Y1) of a composite salt obtained from step (c1) to prepare a colloidal solution (Y2) of a composite salt; (c2) hydrothermally processing solution (Y2) obtained from step (b2); (d) mixing a colloidal solution (Y3) of a composite salt obtained from step (c2) with an alkaline solution and a surfactant to prepare a precipitate; and (e) calcining the precipitate.

4 Claims, No Drawings

(51) Int. Cl.

| | | |
|---|---|---|
| *C01G 25/00* | (2006.01) | |
| *C01B 3/40* | (2006.01) | |
| *B01D 53/94* | (2006.01) | |
| *B01J 37/03* | (2006.01) | |
| *B01J 37/08* | (2006.01) | |
| *B01J 23/42* | (2006.01) | |
| *B01J 23/46* | (2006.01) | |
| *B01J 23/72* | (2006.01) | |
| *B01J 23/745* | (2006.01) | |
| *B01J 23/755* | (2006.01) | |
| *B01J 23/89* | (2006.01) | |
| *B01J 23/00* | (2006.01) | |
| *B01J 37/04* | (2006.01) | |
| *B01J 37/02* | (2006.01) | |

(52) U.S. Cl.
CPC .............. *B01D 2255/20738* (2013.01); *B01D 2255/20753* (2013.01); *B01D 2255/20761* (2013.01); *B01D 2255/407* (2013.01); *B01J 37/0201* (2013.01); *B01J 2523/00* (2013.01); *C01B 2203/0233* (2013.01); *C01B 2203/1047* (2013.01); *C01B 2203/1058* (2013.01); *C01B 2203/1064* (2013.01); *C01B 2203/1076* (2013.01); *C01B 2203/1082* (2013.01); *Y02P 20/52* (2015.11); *Y02T 10/22* (2013.01)

(56) References Cited

U.S. PATENT DOCUMENTS

| | | |
|---|---|---|
| 2007/0042526 A1 | 2/2007 | Myeong et al. |
| 2009/0105070 A1 | 4/2009 | Tanabe et al. |
| 2010/0152077 A1 | 6/2010 | Allston et al. |
| 2010/0230651 A1 | 9/2010 | Myeong et al. |
| 2010/0242342 A1 | 9/2010 | Reed et al. |
| 2010/0303712 A1 | 12/2010 | Nagaoka et al. |
| 2011/0036012 A1 | 2/2011 | Hatscher et al. |
| 2012/0124899 A1 | 5/2012 | Difrancesco et al. |
| 2013/0210617 A1 | 8/2013 | Hernandez et al. |

FOREIGN PATENT DOCUMENTS

| | | |
|---|---|---|
| JP | 2006-181473 A | 7/2006 |
| JP | 2007-504091 A | 3/2007 |
| JP | 2008-229604 A | 10/2008 |
| JP | 2009-263150 A | 11/2009 |
| JP | 2012-504094 A | 2/2012 |
| JP | 2012-512127 A | 5/2012 |
| WO | 2007/142116 A1 | 12/2007 |
| WO | 2010/038204 A1 | 4/2010 |

OTHER PUBLICATIONS

Communication dated Apr. 6, 2016, from the State Intellectual Property Office of the P.R.C. in corresponding Chinese application No. 2013800563679.
Xiaodi Wu et al., "Structure and oxygen storage capacity of Pr/Nd doped $CeO_2$-$ZrO_2$ mixed Oxides", Solid State Sciences 2007, pp. 636-643, vol. 9.
"Development of Stream Reforming Catalyst for Hydrogen Production", IHI Engineering Review, Sep. 2005, pp. 116-120, vol. 45, No. 3.
International Searching Authority International Search Report for PCT/JP2013/076662 dated Nov. 5, 2013.
European Patent Office, Communication dated Jul. 22, 2016 mailed in counterpart Application No. 13845809.6.
International Searching Authority, International Preliminary Report on Patentability dated Apr. 16, 2015, issued in application No. PCT/JP2013/076662.

* cited by examiner

US 9,868,110 B2

METHOD FOR PRODUCING COMPOSITE OXIDE AND COMPOSITE OXIDE CATALYST

CROSS REFERENCE TO RELATED APPLICATIONS

This application is a National Stage of International Application No. PCT/JP2013/076662 filed Oct. 1, 2013, claiming priority based on Japanese Patent Application No. 2012-223741 filed Oct. 8, 2012, the contents of all of which are incorporated herein by reference in their entirety.

FIELD OF ART

The present invention relates to a method for producing a composite oxide which finds use as a catalyst for hydrocarbon steam reforming or purification of exhaust gas, and to a composite oxide catalyst containing the composite oxide.

BACKGROUND ART

Fuel cells with high energy conversion efficiency have recently been developed actively for the purpose of suppression of global warming. Polymer electrolyte fuel cells (PEFCs) are being put into practical household or vehicle uses. PEFCs generate electricity using hydrogen and atmospheric oxygen as fuels, and the hydrogen is produced by steam reforming of hydrocarbon such as in city gas. Efficient steam reforming requires a catalyst, and there have been proposed catalysts such as Ru supported on alumina (Non-patent Publication 1), Pt, Ru, Rh, Pd, and the like supported on an oxide solid solution of Zr, Ce, and Fe or Y (Patent Publication 1), and Pt, Rh, Ni, Co, and the like supported on an oxide containing Ce, Pr, and the like (Patent Publication 2).

These catalysts contain a large amount of precious metals, which adds to cost and uncertainty of supply. Oxidation of the catalysts significantly deteriorates the rate of reforming hydrocarbon to hydrogen, which complicates setting of handling and operating conditions.

High cost of Pt catalyst, which is used in both anode and cathode, obstructs popularization of PEFCs. Particularly a large amount of Pt catalyst is used in the oxygen reduction $\frac{1}{2}O_2 + 2H^+ + 2e^- \rightarrow H_2O$ at cathode. In this regard, development of catalyst materials which can substitute or reduce the amount of Pt catalysts is being made actively.

As a catalyst for purifying exhaust gases used in vehicles or the like, so-called three-way catalyst is used, which oxidizes carbon monoxide and hydrocarbon in exhaust gases to carbon dioxide gas and water, while reduces nitrogen oxide to nitrogen and water. The three-way catalyst is composed, for example, of a catalytic metal, Pt, Rh, or Pd, and a co-catalyst, such as Ce, for improving the catalytic action of the catalytic metal, both supported on a catalyst support, such as alumina or cordierite. The precious metals used as such a catalytic metal have problems in cost and supply, as mentioned above.

PRIOR ART PUBLICATION

Patent Publication 1: JP-2006-181473-A
Patent Publication 2: JP-2008-229604-A
Non-patent Publication 1: IHI Engineering Review, Vol. 45, No. 3, p 116-120 (2005-9)

SUMMARY OF THE INVENTION

It is an object of the present invention to provide a method for producing a composite oxide which finds use as a catalyst for hydrocarbon steam reforming or purification of exhaust gas, reduces problems of the above-mentioned catalysts in cost and supply, achieves a high reforming rate of hydrocarbon to hydrogen even when oxidized, and is easy to handle, as well as a composite oxide catalyst containing this composite oxide.

The present inventors have made intensive researches for solving the above-mentioned problems to find out that, in the production of a composite oxide containing Ce and Zr, which is conventionally effected through one-step hydrothermal processing, a portion of the raw material cerium aqueous solution is subjected to mixing before each step of hydrothermal processing, which is completed in two steps. By this procedure, a composite oxide containing Ce and Zr is obtained which has particular crystallinity and specific surface area, and in which a catalytic metal is more easily dispersed compared to a conventional oxide. Further, by supporting a catalytic metal on the obtained composite oxide, a catalyst is obtained which provides high reforming rate of hydrocarbon to hydrogen and is capable of maintaining the high reforming rate even when oxidized. Based on the above findings, the present invention has been completed.

According to the present invention, there is provided a method for producing a composite oxide comprising the steps of:

(a) preparing at least a cerium aqueous solution 80 to 100 mol % of which cerium ions are tetravalent, and a zirconium aqueous solution containing zirconium ions;

(b1) mixing said zirconium aqueous solution and a portion of said cerium aqueous solution prepared in step (a) to prepare a mixed aqueous solution (X1);

(c1) hydrothermally processing said mixed aqueous solution (X1);

(b2) adding a remainder of said cerium aqueous solution prepared in step (a) to a colloidal solution (Y1) of a composite salt obtained by said hydrothermal processing in step (c1) to prepare a colloidal solution (Y2) of a composite salt;

(c2) hydrothermally processing said colloidal solution (Y2) of a composite salt obtained from step (b2);

(d) mixing a colloidal solution (Y3) of a composite salt obtained by said hydrothermal processing in step (c2) with an alkaline solution and a surfactant to prepare a precipitate; and (e) calcining said precipitate.

According to the present invention, there is also provided a composite oxide obtained by this method.

According to the present invention, there is further provided a composite oxide catalyst comprising this composite oxide and at least one catalytic metal selected from the group consisting of Ni, Cu, Fe, Pt, Pd, and Rh.

According to the present invention, there is further provided a composite oxide catalyst for use as a catalyst for hydrocarbon steam reforming or purification of exhaust gas, said composite oxide catalyst comprising the composite oxide mentioned above and at least one catalytic metal selected from the group consisting of Ni, Cu, Fe, Pt, Pd, and Rh.

The method for producing a composite oxide according to the present invention, wherein the cerium aqueous solution is admixed in two separate steps (b1) and (b2), provides at low cost without uncertainty of supply, a composite oxide in which a catalytic metal is more easily dispersed compared to a conventional oxide. The method of the present invention also provides a composite oxide which finds use in a catalyst for hydrocarbon steam reforming or purification of exhaust gas and which, when used in a catalyst, is capable of achieving a high reforming rate of hydrocarbon to hydrogen and of maintaining the high reforming rate even when the composite oxide is oxidized.

The present invention will now be explained in detail.

The method of the present invention includes step (a) of preparing at least a cerium aqueous solution 80 to 100 mol % of which cerium ions are tetravalent, and a zirconium aqueous solution containing zirconium ions.

The cerium aqueous solution 80 to 100 mol % of which cerium ions are tetravalent may be, for example, a ceric nitrate solution or an ammonium ceric nitrate solution, with the former being preferred.

The initial concentration of the cerium aqueous solution may be adjusted to the cerium content of usually 5 to 100 g/l, preferably 10 to 80 g/l in terms of $CeO_2$. Too low a concentrate results in low productivity and is not industrially advantageous.

The zirconium aqueous solution containing zirconium ions prepared in step (a) may be, for example, a zirconium hydroxide aqueous solution, a zirconium chloride aqueous solution, or a zirconium nitrate aqueous solution, with a zirconium oxynitrate aqueous solution being preferred.

Step (a) may optionally include preparation of, in addition to the cerium aqueous solution and the zirconium aqueous solution, a rare earth metal aqueous solution containing ions of rare earth metals other than cerium, and/or an aqueous solution containing ions of at least one element (sometimes referred to as element M hereinbelow) selected from the group consisting of alkaline earth metal elements, transition metal elements other than Zr, halogen elements, B, C, Si, and S.

The aqueous solutions prepared in step (a) usually contain not less than 10 mol % and not more than 90 mol % of Ce or a mixture of Ce and other rare earth metal s (sometimes referred to as R hereinbelow), not less than 10 mol % and not more than 90 mol % of Zr, or not less than 0 mol % and not more than 20 mol % of M, preferably not less than 50 and not more than 80 mol % of R, not less than 20 mole % and not more than 50 mol % of Zr, or not less than 0 mol % and not more than 20 mol % of element M, with respect to the total of the elements in the resulting composite oxide other than oxygen being 100 mol %.

When R contains Pr, the content of Pr in R is preferably not more than 10 mol %, more preferably not more than 5 mol %.

A zirconium salt may industrially contain a few molar percent of Hf, so that Hf is assumed as being included in Zr herein.

The method of the present invention includes step (b1) of mixing the zirconium aqueous solution and a portion of the cerium aqueous solution prepared in step (a) to prepare a mixed aqueous solution (X1). In this step, the rare earth metal aqueous solution containing ions of rare earth metals other than cerium, and/or the aqueous solution containing ions of at least one element selected from the group consisting of alkaline earth metal elements, transition metal elements other than Zr, halogen elements, B, C, Si, and S, may optionally mixed in the mixed aqueous solution (X1).

The alkaline earth metals may be, for example, Mg, Ca, Sr, or Ba; the rare earth metals other than Ce may be, for example, Sc, Y, La, Nd, Pr, or Tb; and the transition metal elements other than Zr may be, for example, Ti, V, Nb, Ta, Cr, Mo, W, Mn, Fe, Co, Ni, Pd, Pt, Cu, Ag, Zn, Al, Ga, In, Ge, Sn, or Bi.

A portion of the cerium aqueous solution is subjected to mixing in this step (b1), and the remainder of the cerium aqueous solution is subjected to mixing in step (b2) to be discussed below. The ratio by mass of the portions of the cerium aqueous solution subjected to mixing in steps (b1) and (b2) is preferably 0.1:99.9 to 30.0:70.0. At a ratio outside this range, the effect of the cerium aqueous solution subjecting to mixing in two separate portions may not be sufficient.

The method of the present invention includes step (c1) of hydrothermally processing the mixed aqueous solution (X1).

The hydrothermal processing in step (c1) may be, for example, holding under heating of the mixed aqueous solution (X1) to not lower than 60° C. By this holding under heating, a colloidal solution of a cerium-zirconium composite salt is formed. A reaction vessel that may be used may either be a sealed or open vessel, and preferably be an autoclave reactor. The temperature of the holding under heating is usually not lower than 60° C., preferably 60 to 200° C., more preferably 80 to 180° C. The duration of the holding under heating is usually 10 minutes to 48 hours, preferably 30 minutes to 36 hours, more preferably 1 hour to 24 hours. With the holding under heating under insufficient conditions, crystallinity is not increased, and the specific surface area and the crystallinity of the eventually resulting composite oxide may not fall within the desired ranges.

The method of the present invention includes step (b2) of adding the remainder of the cerium aqueous solution prepared in step (a) to a colloidal solution (Y1) of a composite salt obtained by the hydrothermal processing to prepare a colloidal solution (Y2) of a composite salt. In this step, the rare earth metal aqueous solution containing ions of rare earth metals other than cerium, and/or the aqueous solution containing ions of at least one element selected from the group consisting of alkaline earth metal elements, transition metal elements other than Zr, halogen elements, B, C, Si, and S, may optionally mixed in the colloidal solution (Y2) of a composite salt.

The method of the present invention includes step (c2) of hydrothermally processing the colloidal solution (Y2) of a composite salt.

The hydrothermal processing in step (c2) may be performed according to the hydrothermal processing in step (c1).

The method of the present invention includes step (d) of mixing a colloidal solution (Y3) of a composite salt obtained by the hydrothermal processing in step (c2) with an alkaline solution and a surfactant to prepare a precipitate.

Step (d) is a neutralization step with an alkaline solution, which may be, for example, sodium hydroxide, potassium hydroxide, aqueous ammonia, or a mixture thereof, with aqueous ammonia being particularly preferred.

The surfactant may be, for example, anionic surfactant such as ethoxycarboxylate, nonionic surfactant such as alcohol ethoxylate, polyethylene glycol, carboxylic acid, or a mixture thereof, with carboxylic acid being particularly preferred.

The carboxylic acid may preferably be saturated carboxylic acid, such as decanoic, lauric, myristic, or palmitic acid, with lauric acid being particularly preferred.

The amount of the surfactant to be added is usually 1 to 50 parts by mass, preferably 5 to 30 parts by mass, based on 100 parts by mass of the composite oxide to be obtained. At less than 1 part by mass, the specific surface area and the crystallinity of the eventually resulting composite oxide may not fall under the desired ranges.

The surfactant may be used as it is in a solid form, or in the form of a solution prepared by diluting or dissolving the surfactant in a solvent such as alcohol or pure water. The mixing may be carried out in a known mixer.

The obtained precipitate may be separated by, for example, Nutsche method, centrifugation, or filter pressing. The obtained precipitate may be washed with water as necessary. Further, the obtained precursor may be dried to an appropriate extent. The drying may be carried out at about 60 to 200° C.

The method of the present invention includes step (e) of calcining the obtained precipitate.

In step (e), the calcination may be preceded by pre-baking. The temperature of the pre-baking is usually 250 to 700° C., preferably 300 to 500° C. The pre-baking may be carried out in the air or oxygen. The duration of the pre-baking may suitably be decided taking the pre-baking temperature into consideration, and may usually be 1 to 10 hours.

The pre-baked composite oxide is pulverized and then calcined. The calcining temperature is usually 500 to 1200° C., preferably 700 to 1100° C., more preferably 800 to 1050° C. The calcining may be carried out in the air or oxygen, with oxygen being preferred. The duration of the calcining may suitably be decided taking the calcining temperature into consideration, and may usually be 1 to 10 hours.

The obtained composite oxide may be pulverized into a desired particle size as necessary. For example, when used as a composite oxide in a hydrocarbon steam reforming catalyst, the composite oxide preferably has a mean particle diameter of 1 to 50 μm.

The obtained composite oxide may be made into a desired catalyst by supporting at least one catalytic metal selected from the group consisting of Ni, Cu, Fe, Pt, Pd, and Rh. The catalytic metal may be supported on the composite oxide through a conventional method, for example, by impregnating the composite oxide with an aqueous solution of a catalytic metal, followed by calcination. The calcination temperature is usually 250 to 800° C., preferably 300 to 600° C. The calcination may be carried out in the air or oxygen, with oxygen being preferred. The duration of the calcination may suitably be decided taking the calcination temperature into consideration, and may usually be 1 to 10 hours.

Some of the catalyst according to the present invention may exhibit the catalytic performance as it is after the calcination, but may be subjected to activation treatment such as reduction and/or oxidation as necessary.

It is generally advantageous that the composite oxide obtained by the method of the present invention, when used as a catalyst, has a larger specific surface area. Aside from this, the present inventors have found out that higher crystallinity of a composite oxide supporting a catalytic metal results in more effective catalytic performance. Thus, the present inventors have adopted composite oxides having high crystallinity with a specific surface area being maintained as large as possible. Such composite oxides are composed microscopically of two or more very similar $CaF_2$ or the like phases, and it is assumed that good catalytic performance is exhibited due to oxygen tightly taken in at the boundaries of such similar phases and migrated smoothly to thereby reduce the catalytic metal. Two or more very similar $CaF_2$ or the like phases preferably develop when the composite oxide has the above-mentioned composition, specific surface area, and crystallinity, to exhibit good catalytic performance.

The catalyst of the present invention preferably provides a rate of reforming methane to hydrogen of not lower than 40%, preferably not lower than 80%, as determined by heating the catalyst under oxygen flow from the room temperature to 600° C. over 1.5 hours, holding the catalyst at 600° C. for 1 hour, and measuring the methane steam reforming.

The methane steam reforming, as referred to herein, may be determined under the conditions discussed below.

The determination of methane steam reforming may be started by measuring out 50.0 mg of the catalyst, and fixing the catalyst in a fixed-bed reaction tube (inner diameter 11 mm) made of quartz glass with the upper and lower sides of the catalyst held between quartz glass wool. Then hydrogen gas is flown into the reaction tube at 100 ml/min, while the tube is heated from the room temperature to 600° C. over 1.5 hours. The tube, when reaches 600° C., is held for 1 hour to reduce the catalyst. After the reduction, the hydrogen gas is stopped, and nitrogen gas is introduced to evacuate the hydrogen gas from the tube. After thorough evacuation of the hydrogen gas, using nitrogen gas as a carrier gas and methane and water at 1:3, nitrogen gas, methane gas, and water steam are introduced into the reaction tube at 90 ml/min, 2.5 ml/min, and 7.5 ml/min, respectively, and measurement of the rate of reforming methane to hydrogen is started. The measurement is made by sampling the outlet gas four times at 13-minute intervals, analyzing each sample gas by gas chromatography, and taking the average. This procedure is referred to as measurement (1).

After measurement (1), oxygen gas is flown into the reaction tube at 100 ml/min, and the tube is held for 1 hour to oxidize the catalyst. Then the oxygen gas is stopped, and nitrogen gas is introduced to evacuate the oxygen gas from the tube. After thorough evacuation of the oxygen gas, the rate of reforming methane to hydrogen is measured in the same way as in measurement (1). This procedure is referred to as measurement (2).

After measurement (2), hydrogen gas is flown into the tube at 100 ml/min, and the tube is held for 1 hour to reduce the catalyst. After the reduction, the hydrogen gas is stopped, and nitrogen gas is introduced to evacuate the hydrogen gas from the tube. After thorough evacuation of the hydrogen gas, the rate of reforming methane to hydrogen is measured in the same way as in measurement (1). This procedure is referred to as measurement (3).

After measurement (3), nitrogen gas is flown into the reaction tube at 90 ml/min while the temperature is lowered to the room temperature. Then, oxygen gas is flown into the tube at 100 ml/min while the temperature is raised from the room temperature up to 600° C. over 1.5 hours. When the temperature reaches 600° C., the tube is held for 1 hour to oxidize the catalyst. After the oxidization, the oxygen gas is stopped, and nitrogen gas is introduced to evacuate the oxygen gas from the tube. After thorough evacuation of the oxygen gas, the rate of reforming methane to hydrogen is measured in the same way as in measurement (1). This procedure is referred to as measurement (4).

After measurement (4), hydrogen gas is flown into the reaction tube at 100 ml/min, and the tube is held for 1 hour to reduce the catalyst. After the reduction, the hydrogen gas is stopped, and nitrogen gas is introduced to evacuate the hydrogen gas from the tube. After thorough evacuation of the hydrogen gas, the rate of reforming methane to hydrogen is measured in the same way as in measurement (1). This procedure is referred to as measurement (5).

The rate of reforming is calculated as follows using the values of methane ($CH_4$), carbon dioxide ($CO_2$), and carbon monoxide (CO) measured in the gas chromatography.

$$\text{Rate of reforming (\%)} = (1 - CH_4/(CH_4 + CO_2 + CO)) \times 100$$

The catalyst according to the present invention may be used as a substitute for a Pt catalyst in PEFC, catalysts for purifying exhaust gases, or the like, and may preferably be used as a hydrocarbon steam reforming catalyst.

EXAMPLES

The present invention will now be explained with reference to Examples and Comparative Examples, which do not intend to limit the present invention.

Example 1

A portion (5 mass % of the whole) of an aqueous solution of cerium nitrate prepared, not less than 90% of which cerium ions were tetravalent, was mixed with an aqueous solution of zirconium oxynitrate and an aqueous solution of praseodymium nitrate so as to give a composition ratio of 12.0 mol % Ce, 80.0 mol % Zr, and 8.0 mol % Pr, to prepare a 886 ml of a mixed solution at a concentration of 8.7 g/l in terms of oxides, and the obtained mixed solution was placed in al litter separable flask. The separable flask was equipped with a stirrer and a Dimroth condenser tube, and the mixed solution was hydrothermally processed at 98° C. for 8 hours, and cooled down to the room temperature to obtain a colloidal solution (Y1) of cerium-zirconium-praseodymium composite salt.

To the solution (Y1) of the composite salt thus obtained, the remainder (95 mass % of the whole) of the aqueous solution of cerium nitrate not less than 90% of which cerium ions were tetravalent, was added so as to give a compositional ratio of 73.2 mol % Ce, 24.4 mol % Zr, and 2.4 mol % P, to prepare a 1 litter of a colloidal solution (Y2) of cerium-zirconium-praseodymium composite salt at a concentration of 30.5 g/l in terms of oxides. The colloidal solution (Y2) of the composite salt thus obtained was hydrothermally processed at 98° C. for 20 hours in the same way as above, and cooled down to the room temperature to obtain a colloidal solution (Y3) of cerium-zirconium-praseodymium composite salt.

The solution (Y3) of the composite salt was added into an alkaline solution of 23.7 g of ammonium laurate dissolved in 315 ml of 12.5% ammonia solution under stirring at 50 ml/min to obtain a precursor of a composite oxide in a gel form. The gel was subjected to filtration and washing to obtain a filter cake, which was pre-baked at 400° C. for 5 hours, and then calcined in oxygen at 1000° C. for 3 hours. The composite oxide thus obtained was measured with ICP to find that the compositional ratio was 73.2 mol % Ce, 24.4 mol % Zr, and 2.4 mol % Pr, with respect to the total of Ce, Zr, and Pr being 100 mol %. After that, the composite oxide was impregnated with nickel nitrate and palladium nitrate so as to have 5.00 mol % Ni and 1.25 mol % Pd as catalytic metals, with respect to the total of Ce, Zr, and Pr being 100 mol %, and calcined in oxygen at 500° C. for 3 hours to obtain a catalyst. The catalyst thus obtained was analyzed with ICP to find that the Ni and Pd contents were 5.00 mol % and 1.25 mol %, respectively, with respect to the total of Ce, Zr, and Pr being 100 mol %.

The catalyst of the composite oxide thus obtained was subjected to the determination of the methane steam reforming as discussed above. The results are shown in Table 1.

Examples 2 to 6

A composite oxide and a catalyst were prepared in the same way as in Example 1, except that the calcination temperature and the Ni and Pd contents were changed as shown in Table 1. The obtained catalyst was subjected to the determination of the methane steam reforming. The results are shown in Table 1.

Comparative Example 1

An aqueous solution of cerium nitrate not less than 90% of which cerium ions were tetravalent was mixed with zirconium hydroxide and an aqueous solution of praseodymium nitrate so as to give a compositional ratio of 73.2 mol % Ce, 24.4 mol % Zr, and 2.4 mol % Pr, to prepare a 1 litter of a mixed solution at a concentration of 30 g/l in terms of oxides, and the obtained mixed solution was placed in a 1 litter separable flask. The separable flask was equipped with a stirrer and a Dimroth condenser tube, and held under heating at 98° C. for 20 hours. After the holding under heating, the flask was cooled down to the room temperature to obtain a colloidal solution of cerium-zirconium-praseodymium composite salt. The solution of the composite salt was added into 415 ml of 12.5% aqueous ammonia under stirring at 50 ml/min to obtain a precursor of a composite oxide in a gel form. The gel was subjected to filtration and washing to obtain a filter cake. To the obtained filter cake, 3 g of ammonium laurate dissolved in pure water was added and mixed. Then the mixture was pre-baked at 400° C. for 5 hours to obtain a composite oxide. The obtained composite oxide was calcined in oxygen at 1000° C. for 3 hours. The resulting composite oxide was measured with ICP to find that the compositional ratio was 73.2 mol % Ce, 24.4 mol % Zr, and 2.4 mol % Pr.

The composite oxide was impregnated with an aqueous solution of nickel nitrate so as to have 6.25 mol % Ni with respect to the total of Ce, Zr, and Pr being 100 mol %, and calcined in oxygen at 500° C. for 3 hours to obtain a catalyst. The catalyst thus obtained was analyzed with ICP to find that the Ni content was 6.25 mol % with respect to the total of Ce, Zr, and Pr being 100 mol %.

The obtained catalyst was subjected to the determination of the methane steam reforming as discussed above. The results are shown in Table 1.

Comparative Examples 2 to 4

A composite oxide and a catalyst were prepared in the same way as in Examples 2 to 4, except that the calcination temperature was changed as shown in Table 1. The obtained catalyst was subjected to the determination of the methane steam reforming. The results are shown in Table 1.

Comparative Examples 5 to 7

A composite oxide and a catalyst were prepared in the same way as in Comparative Example 1, except that the zirconium hydroxide was replaced with an aqueous solution of zirconium oxynitrate, and the calcination temperature and the Ni and Pd contents were changed as shown in Table 1. The obtained catalyst was subjected to the determination of the methane steam reforming. The results are shown in Table 1.

TABLE 1

| | Ce (mol %) | Zr (mol %) | Pr (mol %) | Total (mol %) | Ni (mol %) | Pd (mol %) | Calcination temperature (° C.) | Reforming rate | | | | |
|---|---|---|---|---|---|---|---|---|---|---|---|---|
| | | | | | | | | Measurement (1) | Measurement (2) | Measurement (3) | Measurement (4) | Measurement (5) |
| Example 1 | 73.2 | 24.4 | 2.4 | 100 | 5.00 | 1.25 | 1000 | 92.2 | 93.0 | 91.3 | 90.8 | 88.8 |
| Example 2 | 73.2 | 24.4 | 2.4 | 100 | 6.125 | 0.125 | 1000 | 89.8 | 87.9 | 88.2 | 87.5 | 86.1 |
| Example 3 | 73.2 | 24.4 | 2.4 | 100 | 6.2375 | 0.0125 | 1000 | 84.8 | 83.9 | 83.5 | 82.2 | 80.7 |
| Example 4 | 73.2 | 24.4 | 2.4 | 100 | 6.25 | 0 | 1000 | 92.1 | 90.9 | 91.6 | 90.0 | 90.5 |
| Example 5 | 73.2 | 24.4 | 2.4 | 100 | 6.125 | 0.125 | 800 | 86.6 | 85.6 | 82.3 | 82.9 | 81.8 |
| Example 6 | 73.2 | 24.4 | 2.4 | 100 | 6.25 | 0 | 800 | 87.2 | 83.4 | 82.3 | 81.2 | 79.9 |
| Com.Ex. 1 | 73.2 | 24.4 | 2.4 | 100 | 6.25 | 0 | 1000 | 90.3 | 90.6 | 90.8 | 90.3 | 89.8 |
| Com.Ex. 2 | 73.2 | 24.4 | 2.4 | 100 | 6.125 | 0.125 | 600 | 76.1 | 74.7 | 72.1 | 75.0 | 71.1 |
| Com.Ex. 3 | 73.2 | 24.4 | 2.4 | 100 | 6.2375 | 0.0125 | 600 | 73.4 | 73.8 | 68.9 | 71.9 | 68.0 |
| Com.Ex. 4 | 73.2 | 24.4 | 2.4 | 100 | 6.25 | 0 | 600 | 68.4 | 0 | 65.1 | 66.3 | 64.6 |
| Com.Ex. 5 | 73.2 | 24.4 | 2.4 | 100 | 5.00 | 1.25 | 1000 | 88.5 | 89.3 | 87.6 | 87.2 | 85.2 |
| Com.Ex. 6 | 73.2 | 24.4 | 2.4 | 100 | 6.125 | 0.125 | 1000 | 86.2 | 84.4 | 84.7 | 84.0 | 82.7 |
| Com.Ex. 7 | 73.2 | 24.4 | 2.4 | 100 | 6.25 | 0 | 800 | 83.7 | 80.1 | 79.0 | 78.0 | 76.7 |

Example 7

A portion (5 mass % of the whole) of an aqueous solution of cerium nitrate prepared, not less than 90% of which cerium ions were tetravalent, was mixed with an aqueous solution of zirconium oxynitrate and an aqueous solution of praseodymium nitrate so as to give a compositional ratio of 4.3 mol % Ce, 87.0 mol % Zr, and 8.7 mol % Pr, to prepare a 919 ml of a mixed solution at a concentration of 16.0 g/l in terms of oxides, and the obtained mixed solution was placed in a 1 litter separable flask. The separable flask was equipped with a stirrer and a Dimroth condenser tube, and the mixed solution was hydrothermally processed at 98° C. for 8 hours, and cooled down to the room temperature to obtain a colloidal solution (Y1) of cerium-zirconium-praseodymium composite salt.

To the solution (Y1) of the composite salt thus obtained, the remainder (95 mass % of the whole) of the aqueous solution of cerium nitrate not less than 90% of which cerium ions were tetravalent, was added so as to give a compositional ratio of 47.6 mol % Ce, 47.6 mol % Zr, and 4.8 mol % Pr, to prepare a 1 litter of a colloidal solution (Y2) of cerium-zirconium-praseodymium composite salt at a concentration of 30.8 g/l in terms of oxides. The colloidal solution (Y2) of the composite salt thus obtained was hydrothermally processed at 98° C. for 20 hours in the same way as above, and cooled down to the room temperature to obtain a colloidal solution (Y3) of cerium-zirconium-praseodymium composite salt.

The solution (Y3) of the composite salt was added into an alkaline solution of 23.7 g of ammonium laurate dissolved in 315 ml of 12.5% ammonia solution under stirring at 50 ml/min to obtain a precursor of a composite oxide in a gel form. The gel was subjected to filtration and washing to obtain a filter cake, which was pre-baked at 400° C. for 5 hours, and then calcined in oxygen at 1000° C. for 3 hours. The composite oxide thus obtained was measured with ICP to find that the compositional ratio was 47.6 mol % Ce, 47.6 mol % Zr, and 4.8 mol % Pr with respect to the total of Ce, Zr, and Pr being 100 mol %. After that, the composite oxide was impregnated with nickel nitrate and palladium nitrate so as to have 5.00 mol % Ni and 1.25 mol % Pd as catalytic metals, with respect to the total of Ce, Zr, and Pr being 100 mol %, and calcined in oxygen at 500° C. for 3 hours to obtain a catalyst. The catalyst thus obtained was analyzed with ICP to find that the Ni and Pd contents were 5.00 mol % and 1.25 mol %, respectively, with respect to the total of Ce, Zr, and Pr being 100 mol %. The catalyst of the composite oxide thus obtained was subjected to the determination of the methane steam reforming as discussed above. The results are shown in Table 2.

Examples 8 to 13

A composite oxide and a catalyst were prepared in the same way as in Example 7, except that the calcination temperature and the Ni and Pd contents were changed as shown in Table 2. The obtained catalyst was subjected to the determination of the methane steam reforming. The results are shown in Table 2.

Comparative Example 8

An aqueous solution of cerium nitrate not less than 90% of which cerium ions were tetravalent was mixed with zirconium hydroxide and an aqueous solution of praseodymium nitrate so as to give a compositional ratio of 47.6 mol % Ce, 47.6 mol % Zr, and 4.8 mol % Pr, to prepare a 1 litter of a mixed solution at a concentration of 30 g/l in terms of oxides, and the obtained mixed solution was placed in a 1 litter separable flask. The separable flask was equipped with a stirrer and a Dimroth condenser tube, and held under heating at 98° C. for 20 hours. After the holding under heating, the flask was cooled down to the room temperature to obtain a colloidal solution of cerium-zirconium-praseodymium composite salt. The solution of the composite salt was added into 415 ml of 12.5% aqueous ammonia under stirring at 50 ml/min to obtain a precursor of a composite oxide in a gel form. The gel was subjected to filtration and washing to obtain a filter cake. To the obtained filter cake, 3 g of ammonium laurate dissolved in pure water was added and mixed. Then the mixture was pre-baked at 400° C. for 5 hours to obtain a composite oxide. The obtained composite oxide was calcined in oxygen at 1000° C. for 3 hours. The resulting composite oxide was measured with ICP to find that the compositional ratio was 47.6 mol % Ce, 47.6 mol % Zr, and 4.8 mol % Pr.

The composite oxide was impregnated with an aqueous solution of nickel nitrate so as to have 6.25 mol % Ni with respect to the total of Ce, Zr, and Pr being 100 mol %, and calcined in oxygen at 500° C. for 3 hours to obtain a catalyst. The catalyst thus obtained was analyzed with ICP to find that the Ni content was 6.25 mol % with respect to the total of Ce, Zr, and Pr being 100 mol %.

The obtained catalyst was subjected to the determination of the methane steam reforming as discussed above. The results are shown in Table 2.

Comparative Examples 9 to 12

A composite oxide and a catalyst were prepared in the same way as in Examples 7 and 9 to 11, except that the calcination temperature was changed as shown in Table 2. The obtained catalyst was subjected to the determination of the methane steam reforming. The results are shown in Table 2.

Comparative Examples 13 and 14

A composite oxide and a catalyst were prepared in the same way as in Comparative Example 8, except that the calcination temperature and the Ni and Pd contents were changed as shown in Table 2. The obtained catalyst was subjected to the determination of the methane steam reforming. The results are shown in Table 2.

(b1) mixing said zirconium aqueous solution and a portion of said cerium aqueous solution prepared in step (a) to prepare a mixed aqueous solution (X1);

(c1) hydrothermally processing said mixed aqueous solution (X1);

(b2) adding a remainder of said cerium aqueous solution prepared in step (a) to a colloidal solution (Y1) of a composite salt obtained by said hydrothermal processing in step (c1) to prepare a colloidal solution (Y2) of a composite salt;

(c2) hydrothermally processing said colloidal solution (Y2) of a composite salt obtained from step (b2);

(d) mixing a colloidal solution (Y3) of a composite salt obtained by said hydrothermal processing in step (c2) with an alkaline solution and a surfactant to prepare a precipitate; and (e) calcining said precipitate.

2. The method according to claim 1, wherein step (a) further comprises preparing a rare earth metal aqueous solution containing ions of rare earth metals other than cerium, and wherein said rare earth metal aqueous solution is mixed in said mixed aqueous solution (X1) in step (b1), or in said colloidal solution (Y2) of a composite salt in step (b2), or both.

3. The method according to claim 1, wherein step (a) further comprises preparing an aqueous solution containing ions of at least one element selected from the group consisting of alkaline earth metal elements, transition metal elements other than Zr, halogen elements, B, C, Si, and S, and wherein said aqueous solution is mixed in said mixed aqueous solution (X1) in step (b1), or in said colloidal solution (Y2) of a composite salt in step (b2), or both.

TABLE 2

|  | Ce (mol %) | Zr (mol %) | Pr (mol %) | Total (mol %) | Ni (mol %) | Pd (mol %) | Calcination temperature (° C.) | Reforming rate | | | | |
|---|---|---|---|---|---|---|---|---|---|---|---|---|
|  |  |  |  |  |  |  |  | Measurement (1) | Measurement (2) | Measurement (3) | Measurement (4) | Measurement (5) |
| Example 7 | 47.6 | 47.6 | 4.8 | 100 | 5.00 | 1.25 | 1000 | 94.4 | 95.3 | 93.8 | 93.3 | 92.4 |
| Example 8 | 47.6 | 47.6 | 4.8 | 100 | 5.625 | 0.625 | 1000 | 93.6 | 93.3 | 91.8 | 91.3 | 90.2 |
| Example 9 | 47.6 | 47.6 | 4.8 | 100 | 6.125 | 0.125 | 1000 | 68.8 | 69.5 | 60.3 | 74.6 | 65.5 |
| Example 10 | 47.6 | 47.6 | 4.8 | 100 | 6.2375 | 0.0125 | 1000 | 77.0 | 69.7 | 68.3 | 67.7 | 66.0 |
| Example 11 | 47.6 | 47.6 | 4.8 | 100 | 6.25 | 0 | 1000 | 94.3 | 0 | 92.3 | 91.2 | 91.7 |
| Example 12 | 47.6 | 47.6 | 4.8 | 100 | 6.125 | 0.125 | 800 | 86.4 | 82.3 | 78.4 | 80.9 | 77.6 |
| Example 13 | 47.6 | 47.6 | 4.8 | 100 | 6.25 | 0 | 800 | 82.5 | 73.9 | 69.9 | 86.6 | 83.2 |
| Com.Ex. 8 | 47.6 | 47.6 | 4.8 | 100 | 6.25 | 0 | 1000 | 93.6 | 0 | 91.5 | 89.9 | 90.6 |
| Com.Ex. 9 | 47.6 | 47.6 | 4.8 | 100 | 5.00 | 1.25 | 600 | 86.8 | 87.0 | 83.0 | 86.6 | 83.2 |
| Com.Ex. 10 | 47.6 | 47.6 | 4.8 | 100 | 6.125 | 0.125 | 600 | 84.1 | 83.2 | 80.4 | 82.1 | 79.0 |
| Com.Ex. 11 | 47.6 | 47.6 | 4.8 | 100 | 6.2375 | 0.0125 | 600 | 81.6 | 76.4 | 73.3 | 74.4 | 71.4 |
| Com.Ex. 12 | 47.6 | 47.6 | 4.8 | 100 | 6.25 | 0 | 600 | 79.6 | 0 | 72.2 | 71.2 | 72.0 |
| Com.Ex. 13 | 47.6 | 47.6 | 4.8 | 100 | 5.00 | 1.25 | 1000 | 90.6 | 91.5 | 90.0 | 89.6 | 88.7 |
| Com.Ex. 14 | 47.6 | 47.6 | 4.8 | 100 | 5.625 | 0.625 | 1000 | 89.9 | 89.6 | 88.1 | 87.6 | 86.6 |

What is claimed is:

1. A method for producing a composite oxide comprising the steps of:

(a) preparing at least a cerium aqueous solution 80 to 100 mol % of which cerium ions are tetravalent, and a zirconium aqueous solution containing zirconium ions;

4. The method according to claim 1, wherein a ratio by mass of the cerium aqueous solution added in step (b1) to the cerium aqueous solution added in step (b2) is 0.1:99.9 to 30.0:70.0.

* * * * *